United States Patent
Callaghan (10) Patent No.: US 7,467,018 B1
(45) Date of Patent: Dec. 16, 2008

(54) EMBEDDED DATABASE SYSTEMS AND METHODS IN AN INDUSTRIAL CONTROLLER ENVIRONMENT

(75) Inventor: David Michael Callaghan, Concord, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 777 days.

(21) Appl. No.: 10/298,852

(22) Filed: Nov. 18, 2002

(51) Int. Cl.
*G05B 15/00* (2006.01)

(52) U.S. Cl. .......................................... 700/1

(58) Field of Classification Search ................. 709/203, 709/246; 700/121, 19, 96, 146; 707/2, 10
See application file for complete search history.

(56) References Cited

U.S. PATENT DOCUMENTS

| | | | |
|---|---|---|---|
| 4,570,217 A | | 2/1986 | Allen et al. |
| 4,771,606 A | | 9/1988 | Mose et al. |
| 5,093,782 A | | 3/1992 | Muraski et al. |
| 5,296,851 A | | 3/1994 | Ikuta et al. |
| 5,508,909 A | * | 4/1996 | Maxwell et al. ............... 700/18 |
| 5,537,548 A | | 7/1996 | Fin et al. |
| 5,602,936 A | | 2/1997 | Green et al. |
| 5,748,930 A | | 5/1998 | Prakash |
| 5,808,907 A | | 9/1998 | Shetty et al. |
| 5,873,086 A | * | 2/1999 | Fujii et al. ..................... 707/10 |
| 5,950,006 A | | 9/1999 | Crater et al. |
| 5,963,448 A | | 10/1999 | Flood et al. |
| 6,032,154 A | | 2/2000 | Coleman et al. |
| 6,061,603 A | | 5/2000 | Papadopoulos et al. |
| 6,105,017 A | * | 8/2000 | Kleewein et al. ............... 707/2 |
| 6,157,649 A | | 12/2000 | Peirce et al. |
| 6,182,252 B1 | | 1/2001 | Wong et al. |
| 6,185,466 B1 | * | 2/2001 | Nicewonger .................. 700/19 |
| 6,268,853 B1 | * | 7/2001 | Hoskins et al. ............... 700/83 |

(Continued)

FOREIGN PATENT DOCUMENTS

WO        WO 01/67196        9/2001

OTHER PUBLICATIONS

Distributed and mobile systems based on wireless networks: definition of a generic control architecture Capella, J.V.; Bonastre, A.; Ors, R.; Serrano, J.J.; Industrial Technology, 2004. IEEE ICIT '04. 2004 IEEE International Conference on vol. 2, Dec. 8-10, 2004 pp. 830-835 vol. 2 Digital Object Identifier 10.1109/ICIT.2004.1490182.*

(Continued)

*Primary Examiner*—Michael B Holmes
(74) *Attorney, Agent, or Firm*—Amin Turocy & Calvin LLP; R. Scott Speroff (57) ABSTRACT

The present invention relates to systems and processes that provide network database interactions in an industrial controller environment. A database protocol component operating in a control environment is provided to convert control or factory protocols to a native language format associated with a network database. Such databases may be accessed in a structured format, wherein one or more control components may be adapted in a client and/or server configuration to freely exchange data in the structured format associated with the database. The database protocol component sends commands and/or data in the structured format when exchanging data with the database while converting the structured format to one or more protocols associated with an industrial control system when receiving commands and/or data therefrom.

28 Claims, 9 Drawing Sheets

U.S. PATENT DOCUMENTS

| | | | |
|---|---|---|---|
| 6,272,400 B1 | 8/2001 | Jankins et al. | |
| 6,282,454 B1 | 8/2001 | Papadopoulos et al. | |
| 6,311,149 B1 | 10/2001 | Ryan et al. | |
| 6,327,511 B1 | 12/2001 | Naismith et al. | |
| 6,345,259 B1 | 2/2002 | Sandoval | |
| 6,389,470 B1 | 5/2002 | Barr | |
| 6,418,430 B1* | 7/2002 | DeFazio et al. | 707/3 |
| 6,453,210 B1* | 9/2002 | Belotserkovskiy et al. | 700/96 |
| 6,556,950 B1* | 4/2003 | Schwenke et al. | 702/183 |
| 6,560,235 B1 | 5/2003 | Jones | |
| 6,564,212 B2* | 5/2003 | Koskas | 707/3 |
| 6,587,900 B1 | 7/2003 | Wischinski | |
| 6,608,638 B1 | 8/2003 | Kodosky et al. | |
| 6,618,856 B2* | 9/2003 | Coburn et al. | 717/135 |
| 6,633,883 B2* | 10/2003 | Koskas | 707/101 |
| 6,662,118 B2 | 12/2003 | Carle et al. | |
| 6,728,262 B1 | 4/2004 | Woram | |
| 6,732,191 B1 | 5/2004 | Baker et al. | |
| 6,751,562 B1* | 6/2004 | Blackett et al. | 702/61 |
| 6,760,782 B1 | 7/2004 | Swales | |
| 6,763,040 B1 | 7/2004 | Hite et al. | |
| 6,779,051 B1 | 8/2004 | Basil et al. | |
| 6,801,920 B1 | 10/2004 | Wischinski | |
| 6,802,053 B1 | 10/2004 | Dye et al. | |
| 6,810,429 B1* | 10/2004 | Walsh et al. | 709/246 |
| 6,819,960 B1 | 11/2004 | McKelvey et al. | |
| 6,822,945 B2 | 11/2004 | Petrovykh | |
| 6,832,118 B1 | 12/2004 | Heberlein et al. | |
| 6,842,779 B1 | 1/2005 | Mishizawa et al. | |
| 6,850,252 B1* | 2/2005 | Hoffberg | 715/716 |
| 6,862,553 B2* | 3/2005 | Schwenke et al. | 702/183 |
| 6,891,849 B1 | 5/2005 | Jasperneite et al. | |
| 6,944,555 B2* | 9/2005 | Blackett et al. | 702/62 |
| 6,993,456 B2* | 1/2006 | Brooks et al. | 702/183 |
| 7,043,532 B1 | 5/2006 | Humpleman et al. | |
| 7,055,056 B2 | 5/2006 | Bessire | |
| 7,058,712 B1* | 6/2006 | Vasko et al. | 709/224 |
| 7,080,066 B1* | 7/2006 | Scheurich et al. | 707/3 |
| 7,085,670 B2 | 8/2006 | Odom et al. | |
| 7,130,701 B1* | 10/2006 | Wischinski | 700/65 |
| 7,151,966 B1* | 12/2006 | Baier et al. | 700/19 |
| 7,162,510 B2 | 1/2007 | Jammes | |
| 7,181,487 B1 | 2/2007 | Marbach et al. | |
| 7,194,446 B1 | 3/2007 | Bromley et al. | |
| 7,203,560 B1* | 4/2007 | Wylie et al. | 700/110 |
| 7,206,643 B2 | 4/2007 | Ruutu et al. | |
| 7,216,043 B2* | 5/2007 | Ransom et al. | 702/62 |
| 7,216,120 B2 | 5/2007 | Yoshida et al. | |
| 7,225,037 B2* | 5/2007 | Shani | 700/18 |
| 7,248,978 B2* | 7/2007 | Ransom | 702/62 |
| 7,251,535 B2* | 7/2007 | Farchmin et al. | 700/26 |
| 7,266,476 B2* | 9/2007 | Coburn et al. | 702/183 |
| 7,277,457 B2 | 10/2007 | Gorday et al. | |
| 7,293,038 B2 | 11/2007 | Blevins et al. | |
| 2002/0082736 A1 | 6/2002 | Lech et al. | |
| 2002/0087229 A1* | 7/2002 | Pasadyn et al. | 700/121 |
| 2002/0116453 A1* | 8/2002 | Todorov et al. | 709/203 |
| 2002/0120728 A1 | 8/2002 | Braatz et al. | |
| 2002/0124011 A1 | 9/2002 | Baxter et al. | |
| 2002/0133807 A1 | 9/2002 | Sluiman | |
| 2002/0174161 A1 | 11/2002 | Scheetz et al. | |
| 2002/0194365 A1 | 12/2002 | Jammes | |
| 2003/0023336 A1 | 1/2003 | Kriedler et al. | |
| 2003/0033376 A1 | 2/2003 | Brownhill et al. | |
| 2003/0051074 A1 | 3/2003 | Edwards | |
| 2003/0061384 A1 | 3/2003 | Nakatani | |
| 2003/0120803 A1 | 6/2003 | Loughran et al. | |
| 2003/0140094 A1 | 7/2003 | Collier et al. | |
| 2003/0149718 A1 | 8/2003 | Theimer | |
| 2003/0154147 A1 | 8/2003 | Parry | |
| 2003/0208595 A1 | 11/2003 | Gouge et al. | |
| 2004/0010627 A1 | 1/2004 | Ellis et al. | |
| 2004/0025060 A1 | 2/2004 | Raffaele et al. | |
| 2004/0039468 A1 | 2/2004 | Zahorack et al. | |
| 2004/0057662 A1 | 3/2004 | Morfino | |
| 2004/0081197 A1 | 4/2004 | Liu | |
| 2004/0107345 A1 | 6/2004 | Brandt et al. | |
| 2004/0111512 A1 | 6/2004 | Barth | |
| 2004/0117624 A1 | 6/2004 | Brandt et al. | |
| 2004/0153819 A1 | 8/2004 | Bjorsne et al. | |
| 2004/0193439 A1* | 9/2004 | Marrott | 705/1 |
| 2004/0201602 A1 | 10/2004 | Mody et al. | |
| 2005/0010311 A1 | 1/2005 | Barbazette et al. | |
| 2005/0021676 A1 | 1/2005 | Chambers et al. | |
| 2005/0038853 A1 | 2/2005 | Blanc et al. | |
| 2005/0074036 A1 | 4/2005 | Gorday et al. | |
| 2005/0103767 A1 | 5/2005 | Kainec et al. | |
| 2005/0131551 A1 | 6/2005 | Ruutu et al. | |
| 2005/0138432 A1 | 6/2005 | Ransom et al. | |
| 2005/0144186 A1 | 6/2005 | Hesselink et al. | |
| 2005/0188351 A1 | 8/2005 | Hoefler et al. | |
| 2005/0198138 A1 | 9/2005 | Heller et al. | |
| 2005/0216897 A1 | 9/2005 | Amrhein et al. | |
| 2006/0010318 A1 | 1/2006 | Coley et al. | |
| 2006/0026672 A1 | 2/2006 | Braun | |
| 2006/0031447 A1 | 2/2006 | Holt et al. | |
| 2006/0080409 A1 | 4/2006 | Bieber | |
| 2006/0108411 A1 | 5/2006 | Macurek et al. | |
| 2006/0129690 A1 | 6/2006 | Hill et al. | |
| 2006/0155865 A1 | 7/2006 | Brandt et al. | |
| 2006/0178760 A1 | 8/2006 | Mann et al. | |
| 2006/0259634 A1 | 11/2006 | Hood et al. | |
| 2006/0287746 A1 | 12/2006 | Braithwaite et al. | |
| 2007/0135947 A1 | 6/2007 | Bromley et al. | |

OTHER PUBLICATIONS

Reconfigurable distributed network control system for industrial plant automation Garcia, J.; Palomo, F.R.; Luque, A.; Aracil, C.; Quero, J.M.; Carrion, D.; Gamiz, F.; Revilla, P.; Perez-Tinao, J.; Moreno, M.; Robles, P.; Franquelo, L.G.; Industrial Electronics, IEEE Transactions onvol. 51, Issue 6, Dec. 2004 pp. 1168-1180.*

A new generic architecture for the implementation of intelligent and distributed control systems Bonastre, A.; Capella, J.V.; Ors, R.; IECON 02 [Industrial Electronics Society, IEEE 2002 28th Annual Conference of the] vol. 3, Nov. 5-8, 2002 pp. 1790-1795 vol. 3.*

Cryptographic Authentication on the Communication from an 8051 Based Development Board over UDP Groza, Bogdan; Murvay, Pal-Stefan; Silea, Ioan; Ionica, Tiberiu; Internet Monitoring and Protection, 2008. ICIMP '08. The Third International Conference on Jun. 29-Jul. 5, 2008 pp. 92-97 Digital Object Identifier 10.1109/ICIMP.2008.27.*

Neural network assisted control loop tuner Wojsznis, W.K.; Blevins, T.L.; Thiele, D.; Control Applications, 1999. Proceedings of the 1999 IEEE International Conference on vol. 1, Aug. 22-27, 1999 pp. 427-431 vol. 1 Digital Object Identifier 10.1109/CCA.1999.806673.*

The integration of two control systems Bickley, M.; White, K.; Particle Accelerator Conference, 1995., Proceedings of the 1995 vol. 4, May 1-5, 1995 pp. 2220-2222 vol. 4 Digital Object Identifier 10.1109/PAC.1995.505504.*

The Scalable Coherent Interface (SCI) Gustavson, D.B.; Qiang Li; Communications Magazine, IEEE vol. 34, Issue 8, Aug. 1996 pp. 52-63 Digital Object Identifier 10.1109/35.533919.*

A bridge crane advanced control system implemented by means of a distributed expert system Capella, J.V.; Bonastre, A.; Ors, R.; Emerging Technologies and Factory Automation, 2003. Proceedings. ETFA '03. IEEE Conference vol. 2, Sep. 16-19, 2003 pp. 347-353 vol. 2 Digital Object Identifier 10.1109/ETFA.2003.1248720.*

Controller area network implementation in microwave systems Furmanski, P.; Stolarski, Z.; Microwaves, Radar and Wireless Communications, 2002. MIKON-2002. 14th International Conference on vol. 3, May 20-22, 2002 pp. 869-873 vol. 3 Digital Object Identifier 10.1109/MIKON.2002.1017975.*

Fulfilling temporal constraints in fieldbus Decotignie, J.-D.; Raja, P.; Industrial Electronics, Control, and Instrumentation, 1993. Proceedings of the IECON '93., International Conference on Nov. 15-19, 1993 pp. 519-524 vol. 1 Digital Object Identifier 10.1109/IECON. 1993.339022.*

Achieving real-time Ethernet Freeman, M.; Manufacturing Engineer vol. 83, Issue 3, Jun.-Jul. 2004 pp. 14-15.*

PEFP monitoring system through an Analog Input to Ethernet Converter Song, Y.G.; Hong, I.S.; Cho, Y.S.; Particle Accelerator Conference, 2007. PAC. IEEE Jun. 25-29, 2007 pp. 287-289 Digital Object Identifier 10.1109/PAC.2007.4440187.*

PCT: Component-based Process Control Testbed Sanz, R.; Chinchilla, R.; Rodriguez, M.; Perez, D.; Martinez, C.; Decision and Control, 2005 and 2005 European Control Conference. CDC-ECC '05. 44th IEEE Conference on Dec. 12-15, 2005 pp. 1577-1582.*

Analysis of real-time data transmission in the DLL of IEC/ISA fieldbus Seung Ho Hong; Seong Jun Ko; Industrial Electronics, 1998. Proceedings. ISIE '98. IEEE International Symposium on vol. 2, Jul. 7-10, 1998 pp. 694-699 vol. 2 Digital Object Identifier 10.1109/ISIE. 1998.711706.*

Networked control systems distance learning: state of art, tendencies and a new fieldbus remote laboratory proposal Mossin, E.A.; Passarini, L.C.; Brandao, D.; Industrial Electronics, 2007. ISIE 2007. IEEE International Symposium on Jun. 4-7, 2007 pp. 1870-1875 Digital Object Identifier 10.1109/ISIE.2007/4374892.*

A Low Cost Local Area Network for Connecting Accelerator Equipment Zwoll, K.; Peters, B.; Vashegyi, T.; Nuclear Science, IEEE Transactions on vol. 32, Issue 5, Part I, Oct. 1985 pp. 2077-2079 Digital Object Identifier 10.1109/TNS.1985.4333820.*

Wikipedia definitions for RDF and URI.

International Search Report,03026338.2-2206-, mailed Mar. 29, 2004.

"Objektorientierte Planung und Abwicklung von Fertigungsauftragen", Von Siegfried Staiger, Geislingen/Steige, Oct. 1995.

Amnon Barak, et al., Performance of PVM with the MOSIX Preemptive Process Migration Scheme, Proc. 7th Israeli Conf. on Computer Systems and Software Engineering, Jun. 1996, 8 pages.

V. Ramesh, et al., A Methodology for Interschema Relationship Identification in Heterogeneous Databases, Proceedings of the 28th Annual Hawaii International Conference on System Sciences, 1995, 10 pages.

Wikipedia, "RS-232" (http://en.wikipedia.org/wiki/RS-232).

Wikipedia, http://en.wikipedia.org/wiki/EoIP.

Wikipedia Definition for "Controller" http://en.wikipedia.org/wiki/Controller_%28_theory%29 date unknown.

Wikipedia Definition for "Protocol Stack" http://en.wikipedia.org/wiki/Protocol_Stack date unknown.

OA Dated Jun. 25, 2008 for U.S. Appl. No. 11/065,953, 21 pages.

* cited by examiner

|       | COL 1   | COL 2 | COL 3 | • • | COL M |
|-------|---------|-------|-------|-----|-------|
|       | NAME    | TAG1  | TAG2  | • • | TAGT  |
| ROW 1 | CONTROL1|       |       | • • |       |
| ROW 2 | CONTROL 2|      |       | • • |       |
| • •   | • •     |       |       |     |       |
| ROW N | CONTROL X|      |       | • • |       |

EMBEDDED DATABASE SYSTEMS AND METHODS IN AN INDUSTRIAL CONTROLLER ENVIRONMENT

TECHNICAL FIELD

The present invention relates generally to industrial control systems, and more particularly to a system and methodology to facilitate data distribution in an industrial control environment.

BACKGROUND OF THE INVENTION

Industrial controllers are special-purpose computers utilized for controlling industrial processes, manufacturing equipment, and other factory automation, such as data collection or networked systems. In accordance with a control program, the industrial controller, having an associated processor (or processors), measures one or more process variables or inputs reflecting the status of a controlled system, and changes outputs effecting control of such system. The inputs and outputs may be binary, (e.g., on or off), as well as analog inputs and outputs assuming a continuous range of values.

Measured inputs received from such systems and the outputs transmitted by the systems generally pass through one or more input/output (I/O) modules. These I/O modules serve as an electrical interface to the controller and may be located proximate or remote from the controller including remote network interfaces to associated systems. Inputs and outputs may be recorded in an I/O table in processor memory, wherein input values may be asynchronously read from one or more input modules and output values written to the I/O table for subsequent communication to the control system by specialized communications circuitry (e.g., back plane interface, communications module). Output modules may interface directly with one or more control elements, by receiving an output from the I/O table to control a device such as a motor, valve, solenoid, amplifier, and the like.

At the core of the industrial control system, is a logic processor such as a Programmable Logic Controller (PLC) or PC-based controller. Programmable Logic Controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. These variables can be user-defined and can be defined as bits, bytes, words, integers, floating point numbers, timers, counters and/or other data types to name but a few examples.

Transmitting, receiving, and storing Programmable Logic Controller (PLC) data generally involves working with a plurality of various protocols—often times proprietary, when accessing such data across various communications networks. Thus, data transactions often involve developing a communications driver and associated software known as middleware to interact with PLCs across networks such as the Ethernet. As one example, if a remote node were to try and retrieve data from a PLC, a middleware communications product would first have to be loaded on the remote node and a driver would have to be configured for the particular network/PLC protocol being employed before a data transaction could occur. Often times, a third software product would have to be installed before such activities as presenting, storing and manipulating such data could occur. Although this type of transaction may work for one particular type of PLC and one particular protocol, this model often breaks down if different PLCs are involved and/or communicate over different networks from the remote node trying to access/manipulate such data. Thus, trying to maintain and access data from various PLC sources employing many different protocols can be exceedingly time consuming to configure and can lead to considerable expense when installing many different software packages in order to attempt to access PLC data.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to facilitate data transactions in a networked industrial controller environment utilizing standard database application programming interfaces (API) and protocols. PLCs and/or communications modules having access thereto are adapted to support client API calls, examples of these API's and underlying protocols are ADO, RDO, DAO, Embedded SQL and VBSQL, OLE-DB, Oracle Objects for OLE (OO4O), PL/SQL, ODBC, DB-Library, TDS (Tabular Data Stream) format, Server DB Interface (Open Data Services—ODS), and network protocols like NW Link IPX/SPX, NetBEUI, TCP/IP, AppleTalk, and Banyan VINES. These will allow client or server devices to transfer data via standard database protocols such as SQL, XML, XMLSQL, to databases, such as relational databases such as Miscrosoft SQL, MySQL, IAnywhere, Sybase Oracle, and Oracle8i, for example.

Modules adapted in accordance with the present invention employ controller tags and/or schema that specify desired elements or data to be stored/accessed and are designed to interact with remote clients and/or servers in the native language or protocol of such systems. In this manner, a PLC or module operating in the controller environment is viewed as a common database node to remote systems attempting data access. Since these modules employ standard database protocols, complex integrations, configurations, and expensive middleware or software packages for accessing controller data is mitigated. Moreover, the communications architecture of the present invention facilitates a more seamless integration between business functions of an enterprise and operations in automated manufacturing centers since the architecture would enable a business software package to acquire and/or send plant-floor data without having to be specially adapted to understand the intricacies of PLC protocols.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to systems and processes that provide network database interactions in an industrial controller environment. A database protocol component operating in a control environment (e.g., adapted on a programmable controller or communications module) is provided to convert control or factory protocols to a native language format associated with a network database. Such databases may be accessed in a structured format, wherein one or more control components may be adapted in a client and/or server configuration to freely exchange data in the structured format associated with the database. The database protocol component sends commands and/or data in the structured format when exchanging data with the database while converting the structured format to one or more protocols associated with an industrial control system when receiving commands and/or data therefrom. In this manner, applications such as a business or enterprise planning software can interact with the control components in a language suitable for the application. As such, control of higher-level factory processes and automated management of an enterprise can be provided without having to integrate middleware software in order to interact and communicate with the control components.

It noted that as used in this application, terms such as "component," "protocol converter," "command interpreter," and the like are intended to refer to a computer-related entity, either hardware, a combination of hardware and software, software, or software in execution. For example, a component may be, but is not limited to being, a process running on a processor, a processor, an object, an executable, a thread of execution, a program and a computer. By way of illustration, both an application running on a server and the server (or control related devices) can be components. One or more components may reside within a process and/or thread of execution and a component may be localized on one computer and/or distributed between two or more computers or control devices. In another example, a protocol converter can be a process executable on a computer or control device to adapt PLC communications formats in accordance with an application that employs network database formats.

Figure 1:
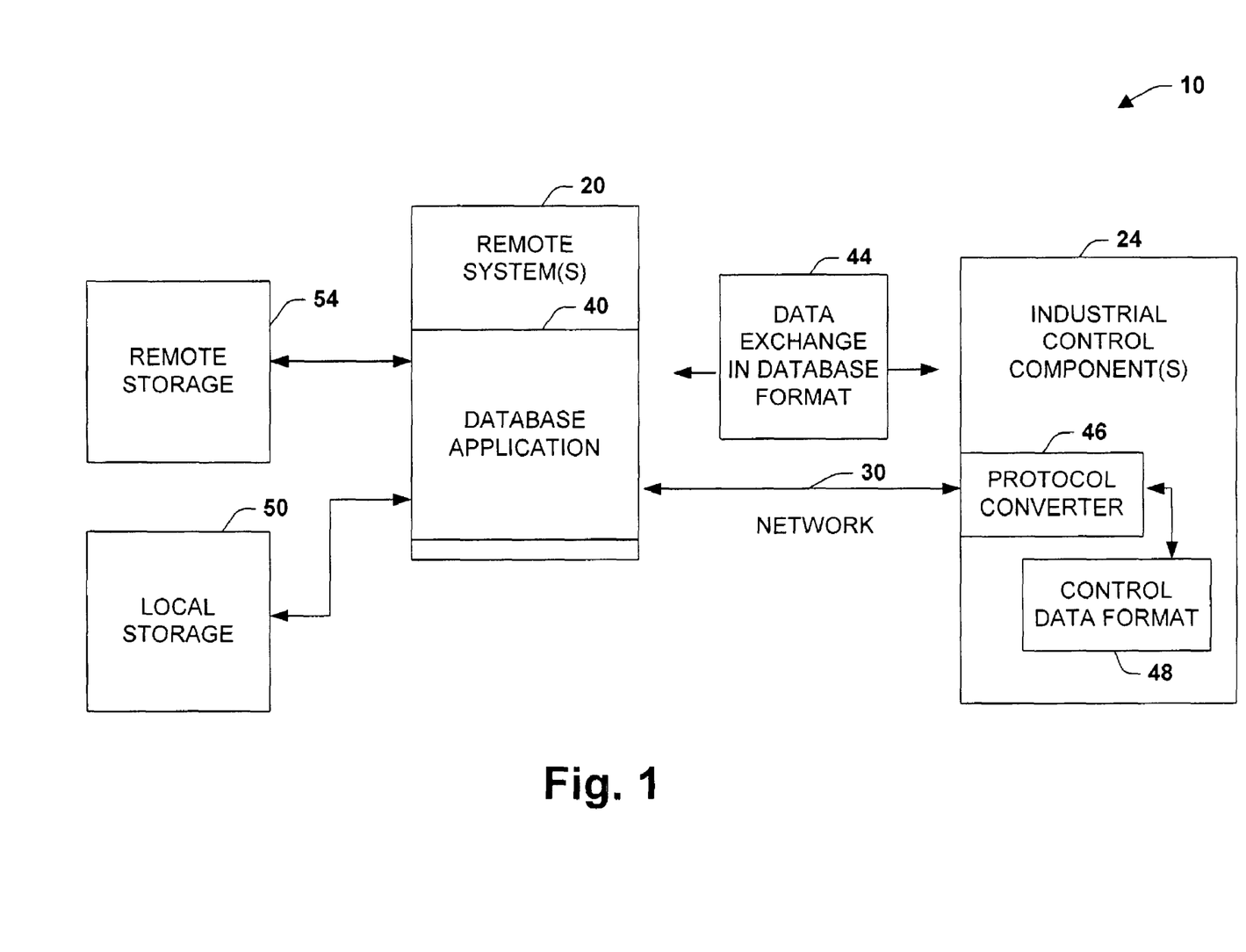
FIG. 1 is a schematic block diagram illustrating a remote database and control system for an industrial control environment in accordance with an aspect of the present invention.

Referring initially to FIG. 1, a remote database and control system 10 for an industrial control environment is illustrated in accordance with an aspect of the present invention. A remote system 20 interacts with one or more industrial control components 24 via a network 30. In the local case, industrial control components 24 may have the database application 40 installed locally and an internal messaging/communication component in lieu of network 30. The remote system 20 can include substantially any type of hardware and/or software (e.g., database application, editing tool, programming tool, communications component, monitoring component) that may interact with the industrial control components 24 which can include programmable logic controllers (PLCs), communications modules and/or I/O modules, whereas the network 30 can include local factory networks (e.g., Ethernet, ControlNet, DeviceNet) and/or public networks such as NW Link IPX/SPX, NetBEUI, TCP/IP, AppleTalk, Banyan VINES or the Internet, for example.

When access is attempted across the network 30 by the remote system 20, a database application 40 can exchange data 44 (e.g., a structured database format such as SQL) with the industrial control components 24 via a protocol converter 46. The protocol converter 46 receives/sends the data 44 in a language associated with the database application 40 and translates the data 44 into a control data format 48 employable by the industrial control components 24 (e.g., PLC data table format, CIP, factory network protocols). Thus, the database application 40 exchanges the data 44 with the industrial control components 24 in a language suitable for storage in a local storage or cache 50 and/or in a remote storage location 54 such as a database server (e.g., store data in a structured row and column format). It is noted that if industrial control component 24 interactions are stored locally, that a subsequent transfer of the local storage can be achieved by transferring files or data from the local storage 50 to the remote storage 54. The interface component 40 can also create/manipulate files, schemas, and/or other data structures (not shown) in the local or remote storage 50 and 54, and tag the files with an identifier relating to the industrial control component 24 that has been accessed. For example, a tag or file name may be created for PLCA, PLCB, Communications module C, I/O module D . . . and so forth.

In one aspect of the present invention, the protocol converter 46 is adapted to exchange the data 44 via standard database API's SQL, XML, XMLSQL, ADO, RDO, DAO, Embedded SQL and VBSQL, OLE-DB, Oracle Objects for OLE (OO4O), PL/SQL, ODBC, DB-Library, TDS (Tabular Data Stream) format, Server DB Interface (Open Data Services—ODS), and network protocols like NW Link IPX/SPX, NetBEUI, TCP/IP, AppleTalk, Banyan VINES. This will allow the protocol converter 46 to support the direct connection between applications on control components 24, and database applications 40 such as relational databases like Miscrosoft SQL, MySQL, IAnywhere, Sybase, Oracle, and Oracle8i, for example. This can include utilizing controller tags, data types and/or schema that specify desired elements or data to be stored/accessed and are designed to interact with remote clients and/or servers in the native language or protocol of such systems. In this manner, the industrial control component 24 is viewed as a common database node to the remote system 20 attempting data access. Since the industrial control components 24 employ standard database protocols, complex integrations, configurations, and expensive middleware or software packages for accessing controller data is mitigated. Furthermore, the communications architecture of the present invention facilitates a more seamless integration between business functions of an enterprise and operations in automated manufacturing centers since the architecture can enable the database application 40 to acquire and/or send plant-floor data without having to be specially adapted to understand the intricacies of industrial control protocols.

Figure 2:
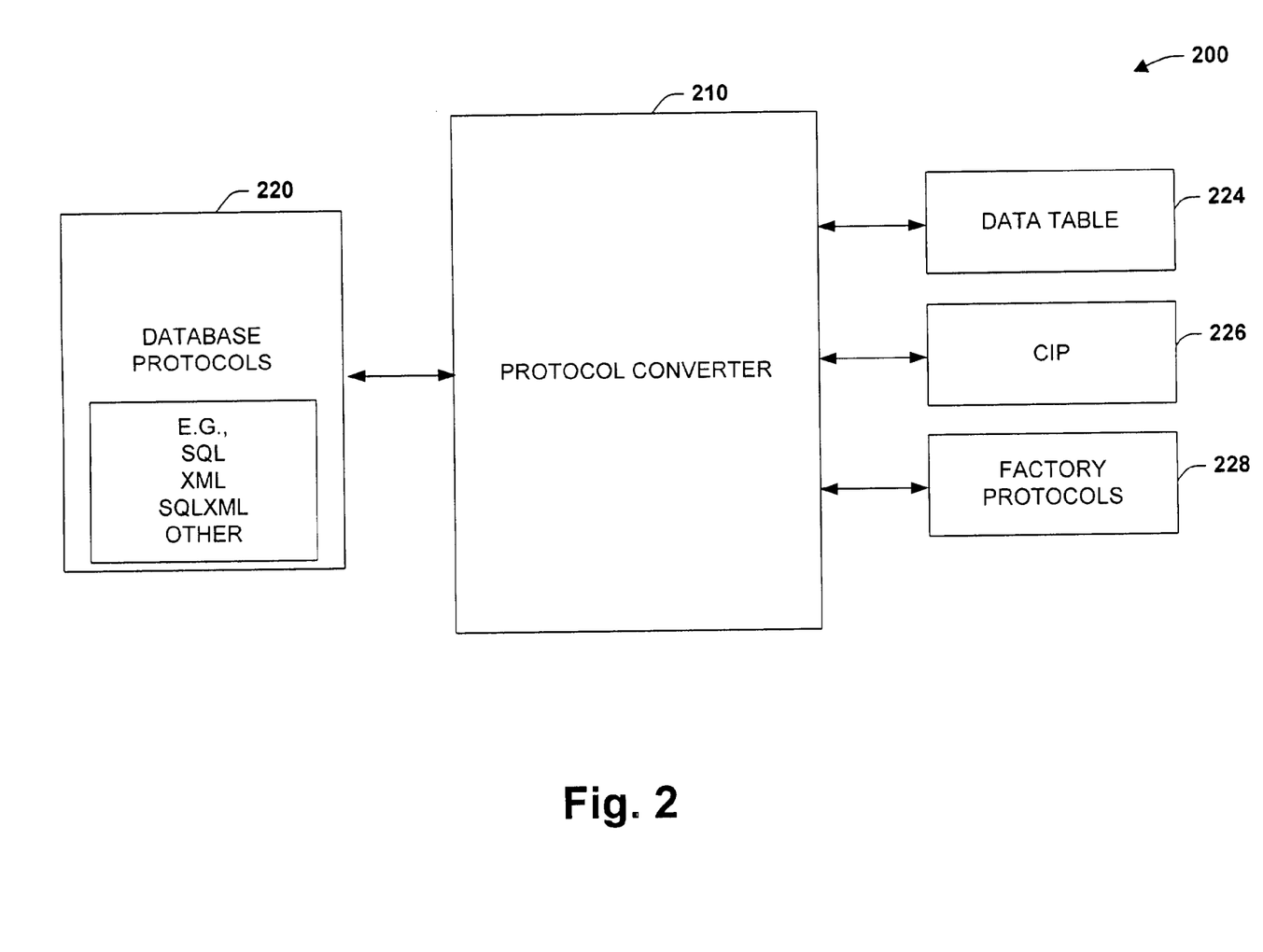
FIG. 2 is a schematic block diagram illustrating a protocol conversion system for an industrial control environment in accordance with an aspect of the present invention.

Referring now to FIG. 2, a protocol conversion system 200 is illustrated in accordance with an aspect of the present invention. A protocol converter 210 is an application(s) that translates/exchanges data and/or commands from one or more database protocols 220 to/from data formats utilized by industrial control system components. For example, the database protocols and API's 220 can be in a Structured Query Language (SQL), Extensible Markup Language (XML), SQLXML, ADO, RDO, DAO, Embedded SQL and VBSQL, OLE-DB, ODBC, DB-Library and/or other database language or interface protocol. The protocol converter 210 converts the database protocols 210 to a protocol or data type employed in an industrial control system and/or converts industrial control system protocols to the database protocols 220. One example of an industrial control system protocol or format is a common data table format at 224 employed in programmable logic controllers (PLC) (or modules associated therewith) (e.g., tags, timers, counters integers, floats, binaries, and so forth). Another industrial protocol is a Control and Information Protocol (CIP) at 226.

Control and Information Protocol 226 is a message-based protocol that implements a relative path to send a message from one or more "producing" devices in a control bus back plane to one or more "consuming" devices. The producing device includes path information that directs the messages to reach the consumers. Since the producing device holds the path information, other devices along the path can simply pass this information. As such, Control and Information Protocol 226 employs a "producer/consumer" networking model. In traditional I/O systems, controllers poll input modules to obtain their input status. In a CIP system, digital input modules are not polled by a controller, for example. Instead, these modules produce ("multicast") associated data either upon a change of state (COS) and/or periodically. The frequency of update depends upon options selected during configuration and where on the network the input module resides. The input module, therefore, is a producer of input data and the controller and/or communications module is a consumer of the data. The controller can also produce data for other controllers to consume and/or can produce data for other modules in the back plane to consume such as an output module, for example. The produced and consumed data can be accessible by multiple controllers over a back plane and/or over a network.

In another example, the protocol converter 210 converts/ translates the database protocols to other factory protocols at 228 (and vice versa). Such protocols 228 can include Ethernet, ControlNet, DeviceNet, remote I/O protocols, Data Highway and Data Highway+ protocols, Fieldbus, Modbus, Profibus, OLE for Process Control (OPC) and so forth. It is to be appreciated that substantial any database protocol can be converted to/from an industrial control system protocol by the protocol converter 210 and in accordance with the present invention.

Figure 3:
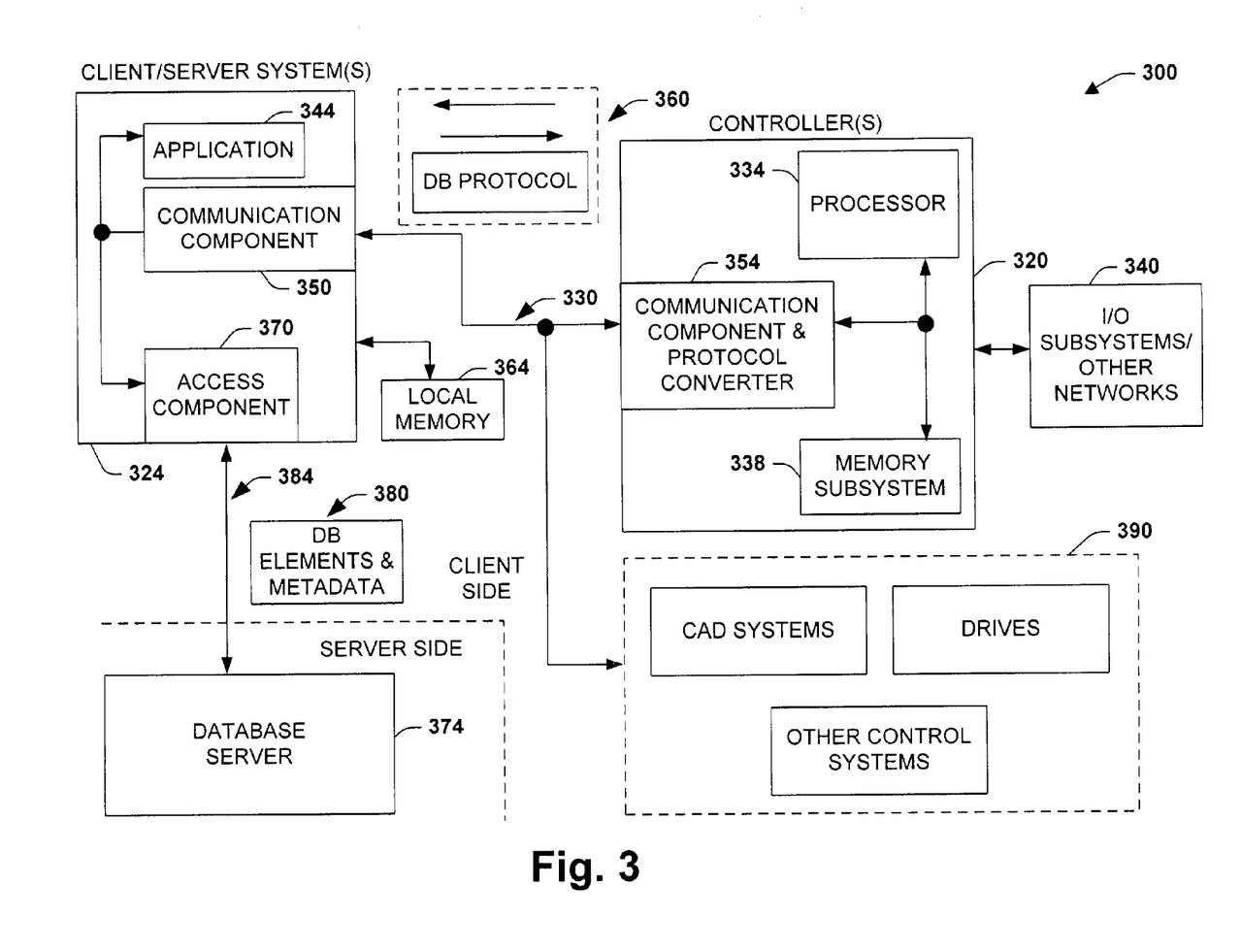
FIG. 3 is a schematic block diagram illustrating an exemplary industrial control and database system in accordance with an aspect of the present invention.

Referring to FIG. 3, an exemplary industrial control and database system 300 is illustrated in accordance with an aspect of the present invention. The system 300 includes an industrial controller 320 communicating to one or more client/server systems 324 across a local factory network (e.g., DeviceNet, ControlNet, Ethernet, DH+, Intranet) and/or a public network 330 such as the Internet. This can also include other communications options such as phone connections and/or wireless interactions. A processor 334 (or processors) in the controller 320 executes from an associated memory subsystem 338 that can include an operating system (e.g., Microsoft® Windows® NT/2000/XP, Windows CE, Linux, .NET, OS-9, UNIX, VRTX, QNX, VxWorks, CE.NET, custom-designed). The controller 320 can also communicate to and control various Input/Output subsystems 340 and/or other networks (e.g., Analog, Digital, Programmed/Intelligent I/O modules, other programmable controllers, communications modules, networks).

The client/server system 324 (can be client and/or server system) includes at least one application 344 that interacts with a client/server communications component 350 (e.g., database software) to exchange data with the controller 320 via a communications component 354 suitably adapted to transfer information on the network 330 via a database protocol 360, wherein the communications component 354 includes a protocol converter as described above. As illustrated, control data 360 can be exchanged (e.g., data sent or received) to/from the controller 320 (or other control components, databases) in response to instructions or commands executed by the application 344 and/or controller 320. The application 344 can include substantially any type of software for manipulating the database protocol 360 such as an editor tool, database application, or interface component, for example, whereby the database protocol 360 is generally processed on a local memory or storage device 364. It is noted that the controller 320 can be adapted in a client and/or server configuration to exchange the database protocol 360 with the client/server system 324.

In accordance with one aspect of the present invention, an access component 370 is provided to interact with the application 344 and exchange/store data in a database format as described above. This data can be stored on the local memory 364 and/or on a server database 374 (e.g., can include commercially available SQL server). It is noted that transactions with the server database 374 can also be attempted even though the transactions may not affect the controller 320 (e.g., operate in accordance with database protocols 360 in an offline manner). It is to be appreciated that the database protocols 360 can be stored as database elements 380 (e.g., SQL elements, XML schema, data structures) describing controller functions and associated data affecting the controller and/ or other industrial control components. In addition, metadata can be associated with the database elements 380 that describe supervisory aspects of the present invention such as for control and security purposes, for example.

It is noted that the access component 370 (e.g., API set to access database) can act as an intermediary component between the application 344 and the database 374. As such, a separate communications network 384 (or software channel/ socket) can exist between the access component 370 and database 374, if desired. In another aspect, the access component 370 can communicate through the client/server communications component 350 and network 330 to transfer information to and from the database 374. In addition, the access component 370 can be provided as a re-locatable object wherein the object is operated on various or different platforms/applications to exchange data, control and/or monitor industrial control activities. As one example, the access component 370 can be located and/or operated in the memory subsystem 338 of the controller 320.

In another aspect of the present invention, the database protocols 360 can be generated by and/or operated upon via one or more auxiliary control systems or control support systems (suitably adapted with an associated protocol converter) illustrated at reference numeral 390. For example, the systems at 390 which can also exchange data base protocols 360 stored and retrieved from the database 374 include CAD systems, drives, and/or other control systems such as modeling systems, robotic systems, and/or advanced manufacturing cells.

Figure 4:
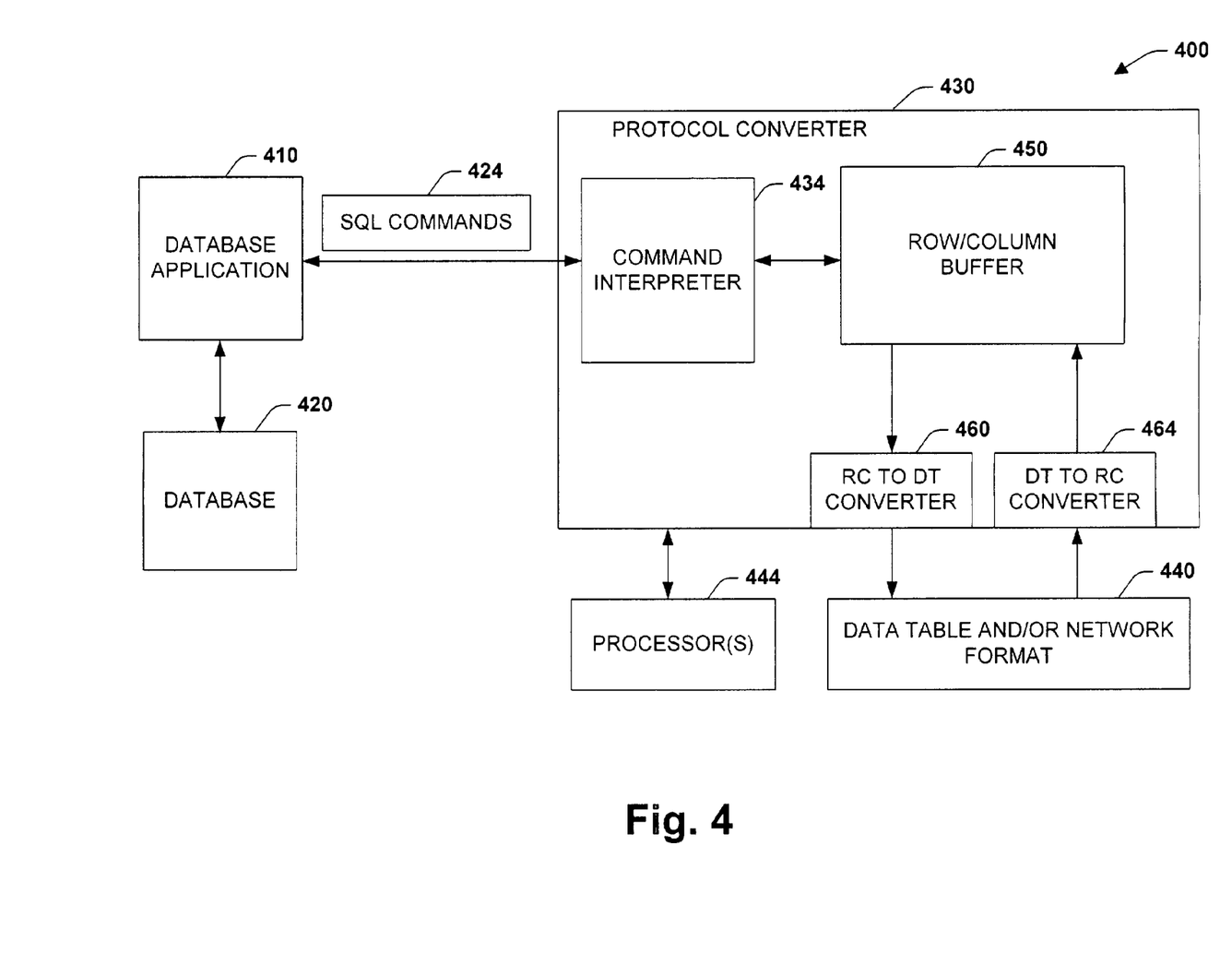
FIG. 4 illustrates an exemplary data exchange in accordance with an aspect of the present invention.

FIG. 4 illustrates a system 400 providing an exemplary data exchange in accordance with an aspect of the present invention. Before proceeding with a description of the system 400, it is noted that an SQL format is described for example purposes, however, it is to be appreciated that the present invention is not so limited in that other database protocols and/or structures may be employed in accordance with the present invention. A database application 410 stores and retrieves data from a local and/or remote database 420, wherein such data is exchanged in accordance with one or more SQL commands 424. The SQL commands 424 interact with a protocol converter 430 having a command interpreter 434 that decodes the SQL commands (or generates SQL commands in reverse direction) and converts SQL data format to and from a data table format and/or network format 440 operable with an industrial control component (not shown). As illustrated, the protocol converter 430 can be executed by a processor 444 (or processors) having an associated memory subsystem (not shown).

The command interpreter 434 interacts with a row/column buffer 450, wherein SQL data from the database 420 is translated as the data table and/or network data 440 via a row/column to data table converter 460 (e.g., code that associates row/column data with an industrial control component data format). Similarly, if data is to be sent from the data table and/or network format 440, a data table to row/column converter 464 (e.g., code that associates an industrial control component data format with row/column format) is employed to transmit industrial control component data to the row/column buffer 450 for subsequent storage in the database 420 and/or interaction with the database application 410. The command interpreter 434 thus controls a bi-directional dataflow between the database application 410, database 420, and respective industrial control components in a native language of the database 420. To illustrate an example of how the commands 424 may be processed by the command interpreter 424, the following discussion describes some exemplary SQL commands, operators, clauses, and/or functions. It is to be appreciated however, that the present invention is not limited by the following examples, wherein other database formats and/or functions may be employed in accordance with the database and/or protocol conversion principles described herein.

Structured Query Language (SQL) is one example of a database protocol utilized to communicate with a database. According to ANSI (American National Standards Institute), it is generally considered the standard language for relational database management systems. SQL statements (described below) are employed to perform tasks such as update data on a database, or retrieve data from a database. Some common relational database management systems that use SQL are: Oracle, Sybase, Microsoft SQL Server, Access, Ingres, and so forth. Although many database systems employ some form of SQL, many of these systems also have additional proprietary extensions that are applicable to the respective database system. However, many standard SQL commands such as "Select", "Insert", "Update", "Delete", "Create", and "Drop" can be utilized to achieve many database interactions.

A relational database system generally contains one or more objects called tables. Data or information for the database is typically stored in these tables. Tables are uniquely identified by their names and are comprised of columns and rows. Columns contain a column name, data type, and other attributes for the column. Rows contain the records or data for the columns. The following illustrates some example SQL commands that may be employed for accessing such databases.

A select statement is used to query the database and retrieve selected data that match criteria that is specified such as:

select "column1"
   [,"column2",etc]
   from "tablename"
   [where "condition"];
   [ ]=optional Column names that follow the select keyword determine which columns will be returned in the results. This can include selecting multiple column names, or using a "*" to select all columns. The table name that follows a keyword from specifies the table that will be queried to retrieve the desired results. A where clause (optional) specifies which data values or rows will be returned or displayed, based on the criteria described after the keyword where.

Conditional selections used in the where clause may include:
= Equal
\> Greater than
< Less than
\>= Greater than or equal
<= Less than or equal
< > Not equal to LIKE *See note below A LIKE pattern matching operator can also be used in the conditional selection of the where clause. Like is an operator that enables selections of rows that are "like" what is specified. A percent sign "%" can be utilized as a wild card to match possible characters that might appear before or after the characters specified.

For purposes of brevity one or more of the following commands and/or operators can also be employed in accordance with the present invention and as are readily understood with regards to SQL database languages. These commands can include create table statements having associated constraints if desired, insert statements, update statements, delete statements, drop table commands, aggregate functions such as:

| | |
|---|---|
| MIN | returns the smallest value in a given column |
| MAX | returns the largest value in a given column |
| SUM | returns the sum of the numeric values in a given column |
| AVG | returns the average value of a given column |
| COUNT | returns the total number of values in a given column |
| COUNT(*) | returns the number of rows in a table |

Other possible examples commands or functions include group by clauses, having clauses, order by clauses, conditional and/or boolean operators for accessing desired rows and/or columns, in and between clauses, mathematical operators, modulo operators, and/or join functions or operators to facilitate relational operations with a database.

Figure 5:
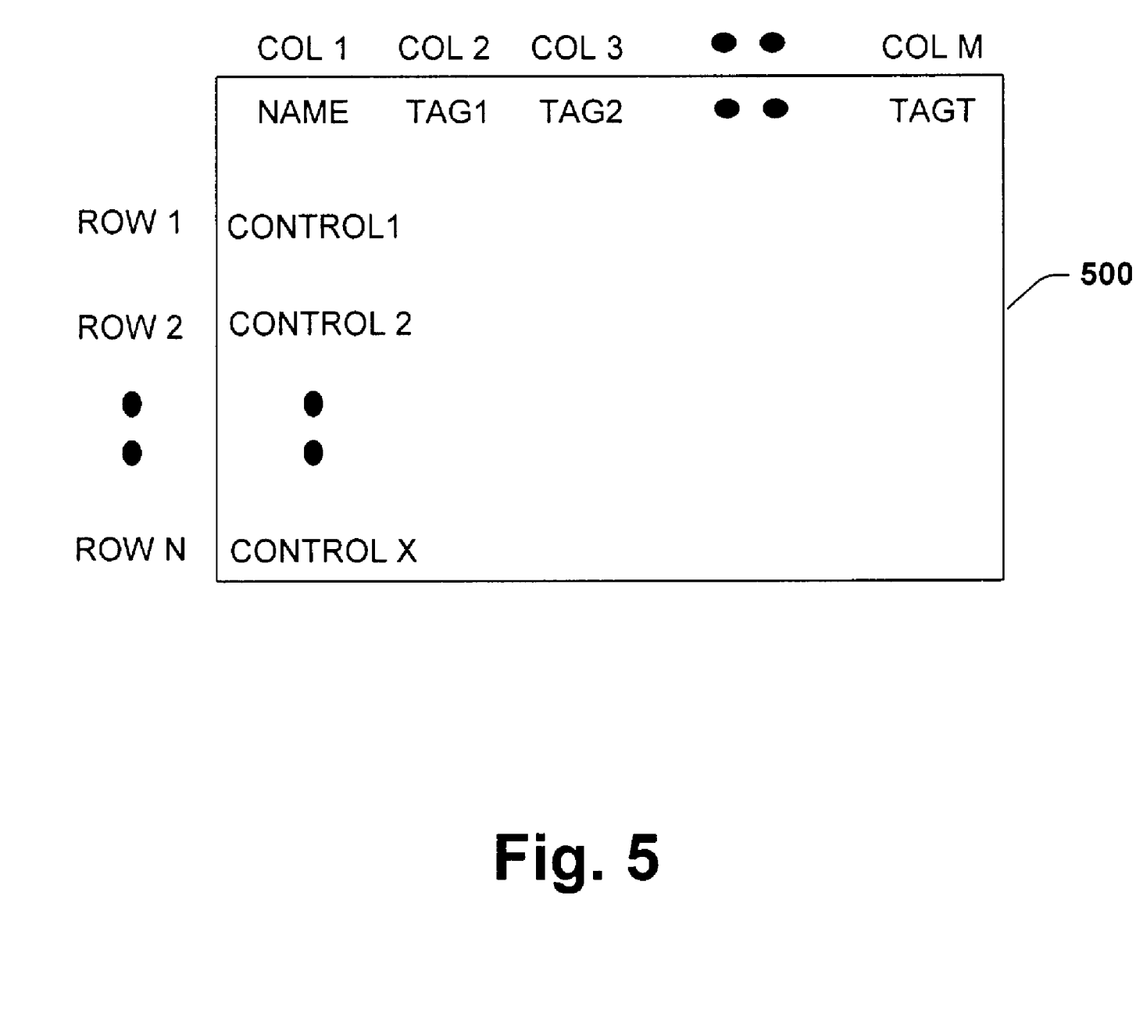
FIG. 5 illustrates an exemplary database object in accordance with an aspect of the present invention.

FIG. 5 illustrates an exemplary data object 500 in accordance with an aspect of the present invention. The data object 500 includes one or more rows 1 though N, having one or more columns 1 through M, N and M being integers respectively. The data object 500 is one possible example of how controller data (or module data associated therewith) may be organized on a database. It is to be appreciated that other data organizations are possible. In this example, column1 is associated with a controller name, whereas columns 2-M represent tag information associated with the named controller. For example, in row 1 and column 1, a control 1 is identified having associated tags, tag 1 through tag T, T being an integer. Similarly, row 2 and so forth are associated with a respective controller name having associated tag data stored therein. Thus, in this example, a database could query a plurality of networked controllers or modules in a structured language format, and receive data records for the respective controllers that report on the network, wherein the data is then collected and stored in the data object 500. As can be appreciated, data for individual controllers or controller subsets may be collected and stored in one or more different data objects having row and column formats.

Figure 6:
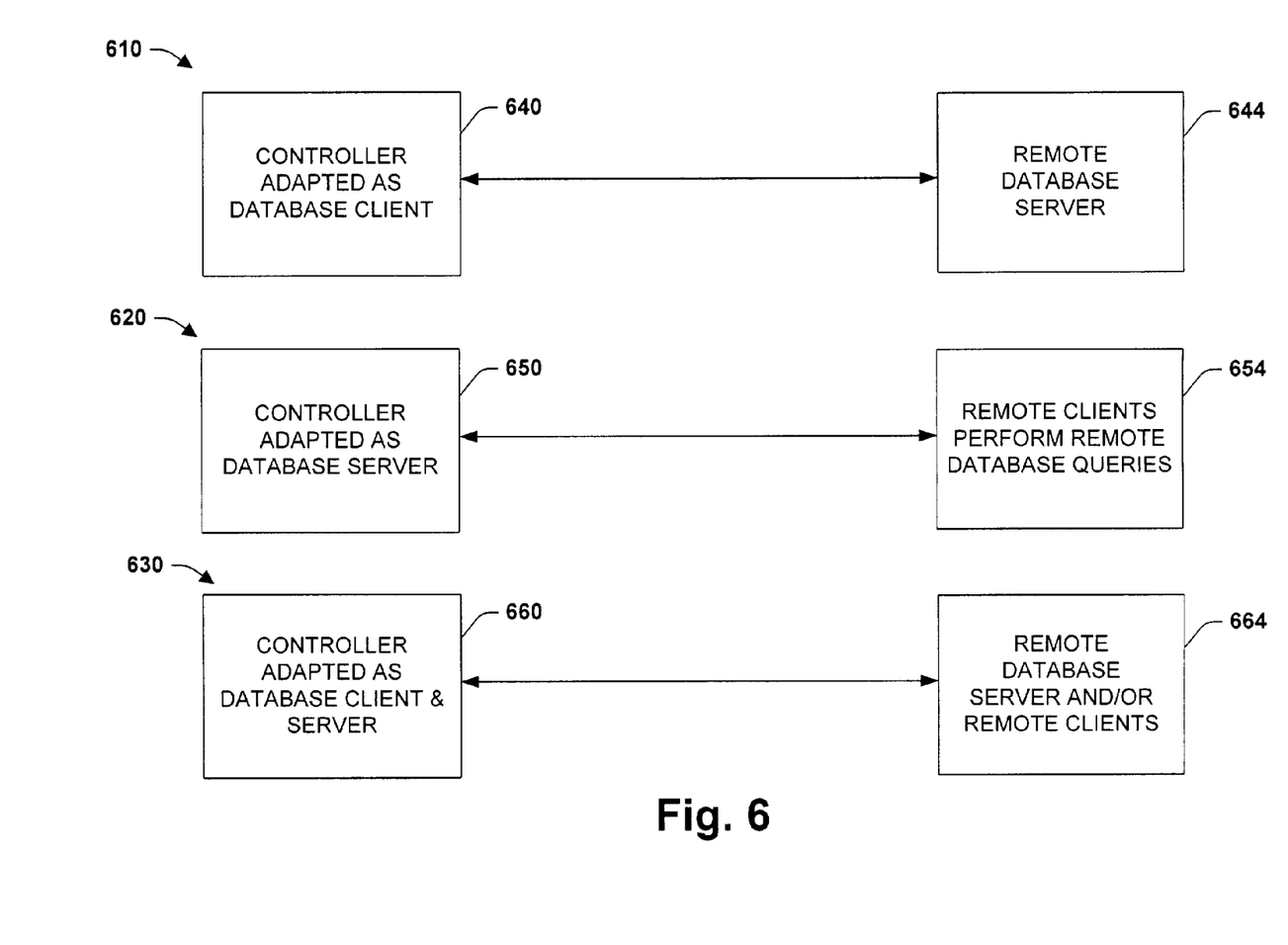
FIG. 6 illustrates alternative database systems in accordance with an aspect of the present invention.

FIG. 6 illustrates a system 610, a system 620 and a system 630 that represents three exemplary aspects of the present invention. The systems 600-630 depict various client and/or server configurations, wherein controllers or modules associated therewith may be adapted in client configurations, server configurations, and/or client server configurations when exchanging data with remote systems. It is noted that the remote systems depicted may also be adapted in client configurations, server configurations, and/or client server configurations in order to exchange data with control components adapted in accordance with the present invention. The system 610 illustrates a controller 640 adapted as a database client and interacting with one or more remote database servers 644. In this aspect, the controller 640 can store and/or retrieve data from the remote server 644 such as an SQL server while utilizing standard SQL protocol. The system 620 illustrates a controller 650 adapted as a database server, wherein one or remote clients 654 perform standard database queries to retrieve data from the controller 650. The system 630 depicts a controller 660 adapted as a database client and server that communicate with one or more remote database servers and/or clients 664.

Figure 7:
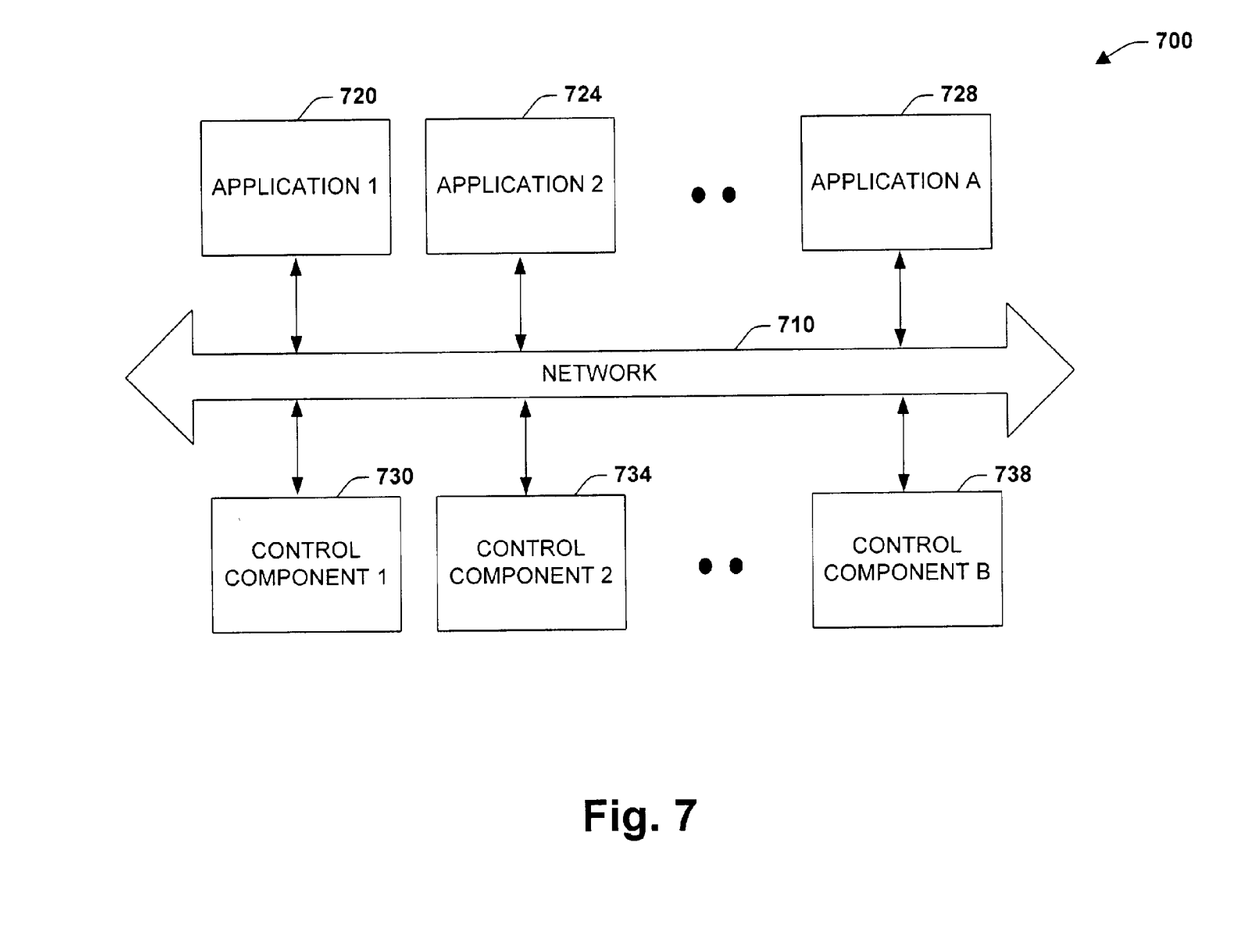
FIG. 7 illustrates network database systems in accordance with an aspect of the present invention.

FIG. 7 illustrates a network system 700 for exchanging data in a control environment in accordance with an aspect of the present invention. A network 710 such as the Internet and/or factory network adapted thereto facilitates data exchange between one or more applications 720-728 and one or more control components 730-738. In this example, respective applications may represent data collection, monitoring, quality control, accounting, material management, and/or other application. Such applications can query the network 710 if desired, in a structured database format, wherein the control components 730-738 (or subset thereof) report data in response to the query in the language format associated with the query. In one aspect, the applications 720-724 can send a query, determine which control components have reported, and determine from the query a "who" function indicating the respective control components reporting on the network 700 and thus derive an associated network configuration. Similarly, if the control components 730-738 have changed circumstances such as a fault, diagnostic, or maintenance condition and/or to report status, the control components can transmit data in a structured database format to one or more of the applications 730-738 as a response to the respective circumstances, wherein the applications can then store data for future analysis and/or process the data as it is reported from the control components 720-728.

Figure 8:
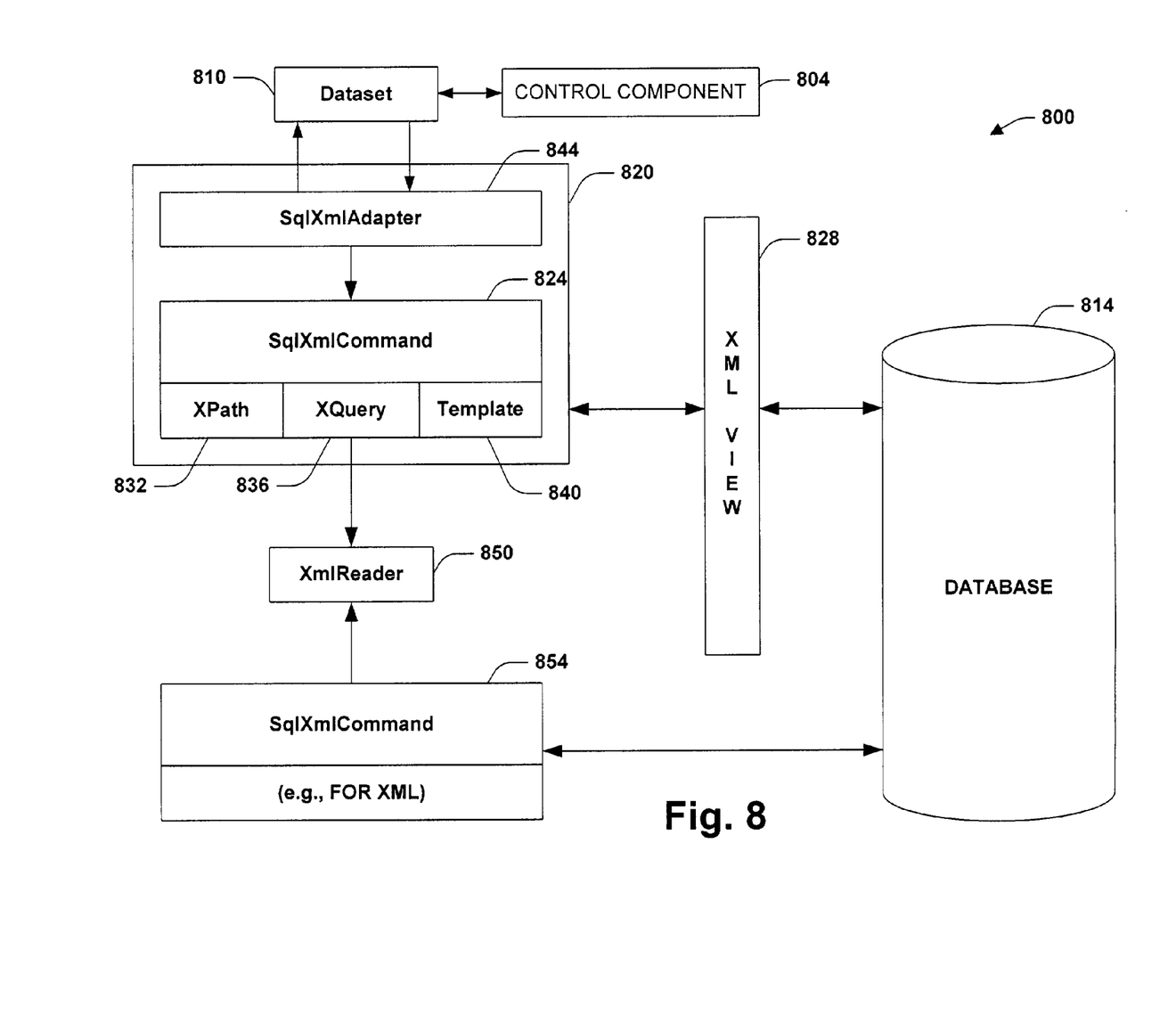
FIG. 8 illustrates an SQLXML database system in accordance with an aspect of the present invention.

FIG. 8 illustrates a system 800 depicting one or more architectural aspects in accordance with the present invention. A control component 804 such as described above interacts with a data set 810 that sends XML data to and receives data from an SQL database (or server) 814, wherein a managed class 820 operates in accordance with a system (e.g., network computer) to facilitate transformations between data structures and interactions between operating platforms. Generally, three primary classes are employed to access XML functionality of the SQL Server 814. These are:

SqlXmlCommand at 824 is employed to send a Transact-SQL statement to the database 814, execute a stored procedure, or query the database via other technologies such as annotated schemas/other XML views at 828 and retrieve results as XML.

SqlXmlParameter (not shown) specifies a value for a parameter in the command class and/or other class. This can be a parameter to control another class, an ad hoc query, stored procedure, XPath query at 832, Xquery at 836, and/or XML template at 840.

SqlXmlAdapter at 844 is employed to populate a DataSet object with an XML result set, or update the database 814.

The SqlXmlCommand class 824 is employed when retrieving data from the SQL Server 814 in XML format. This class 824 enables users/systems to send queries to the database and retrieve the results as a stream or XmlReader object at 850, and/or to send the output into another stream. The query can be parameterized, and via the SqlXmlParameter class, users/systems can specify values for the parameters. Remote systems can execute queries via ad hoc Transact-SQL statements, stored procedures, annotated schemas, Xpath 832, Xquery 836 and templates 840. XML data can be returned from the database or server 814, or alternatively a conversion to XML on the client side can be performed by setting a property in the managed class 820. In addition, the SqlXmlCommand can automatically apply a style sheet to an XML result set, performing a transformation between data structures.

Other operations performed by the command class 824 include retrieving XML data via an ExecuteStream method which returns XML data from SQL Server 814 as a managed code stream instance. One reason for returning results as a stream may be to perform an operation on a document as a whole without substantial regard for its contents. Such an operation could include compressing or encrypting the result set. In this case, the XML results are generally not treated as an actual XML document, but rather as a stream of bytes. In another instance, rather than return XML data from SQL Server 814 as a Stream object, an XML result can be sent directly to the destination 810 and 804 without modification. In this case, an ExecuteToStream method sends resulting XML to a FileStream object, a NetworkStream object, and/or a Response object.

An ExecuteXmlReader method, which returns an Xml-Reader object at 850 is a high-performance object that can iterate through one or more nodes in an XML result set. If random access is needed to the XML results, XmlReader can be passed as an argument to a constructor of an XmlDocument object (not shown). The XmlDocument object can be employed with a Document Object Model (DOM), for example, for manipulating the result set.

In some cases, existing stored procedures may not be edited to return an XML result set. For example, consider the following stored procedure:

Generating XML on the client side generally involves the following acts:

Setting a ClientSideXml property of the SqlXmlCommand object to true at 824.

A CommandText property updated to contain "FOR XML NESTED" or "FOR XML RAW" or "FOR XML Explicit". This clause is intercepted by an OLE DB (or other type) provider at reference numeral 854, and indicates that the result set should be converted to XML. Though the stored procedure may not have not been modified, an XmlReader object can be instantiated on the client or remote system.

If ad hoc queries or stored procedures are employed to query the SQL Server 814, columns in the result set can be serialized as attributed in a resulting XML document. There is also an element-centric mode for returning XML via NESTED, AUTO or RAW XML modes. If the format of returned XML should be changed, an annotated schema can be employed to define which columns will be expressed as elements, and which columns will be expressed as attributes. Annotated schemas enable modifying the result set via Xpath at 832. An annotated schema is an XML schema document that specifies tables and columns to query in SQL, and the structure of a resulting XML format. A SchemaPath property specifies a physical path to a schema file. This path can be relative to the location of the executable. The schema file maps resulting XML to tables and columns in the database. A CommandText property specifies an XPath query 832 that defines an XML result set, wherein XPath syntax at 832 searches for matching elements and can limit a resultant set of data. XPath 832 can be employed in conjunction with XSL Transformations (XSLT) to select specified nodes from an input XML document for transformation or rendering. XPath can also be utilized with DOM to select a subset of nodes to work with programmatically.

Figure 9:
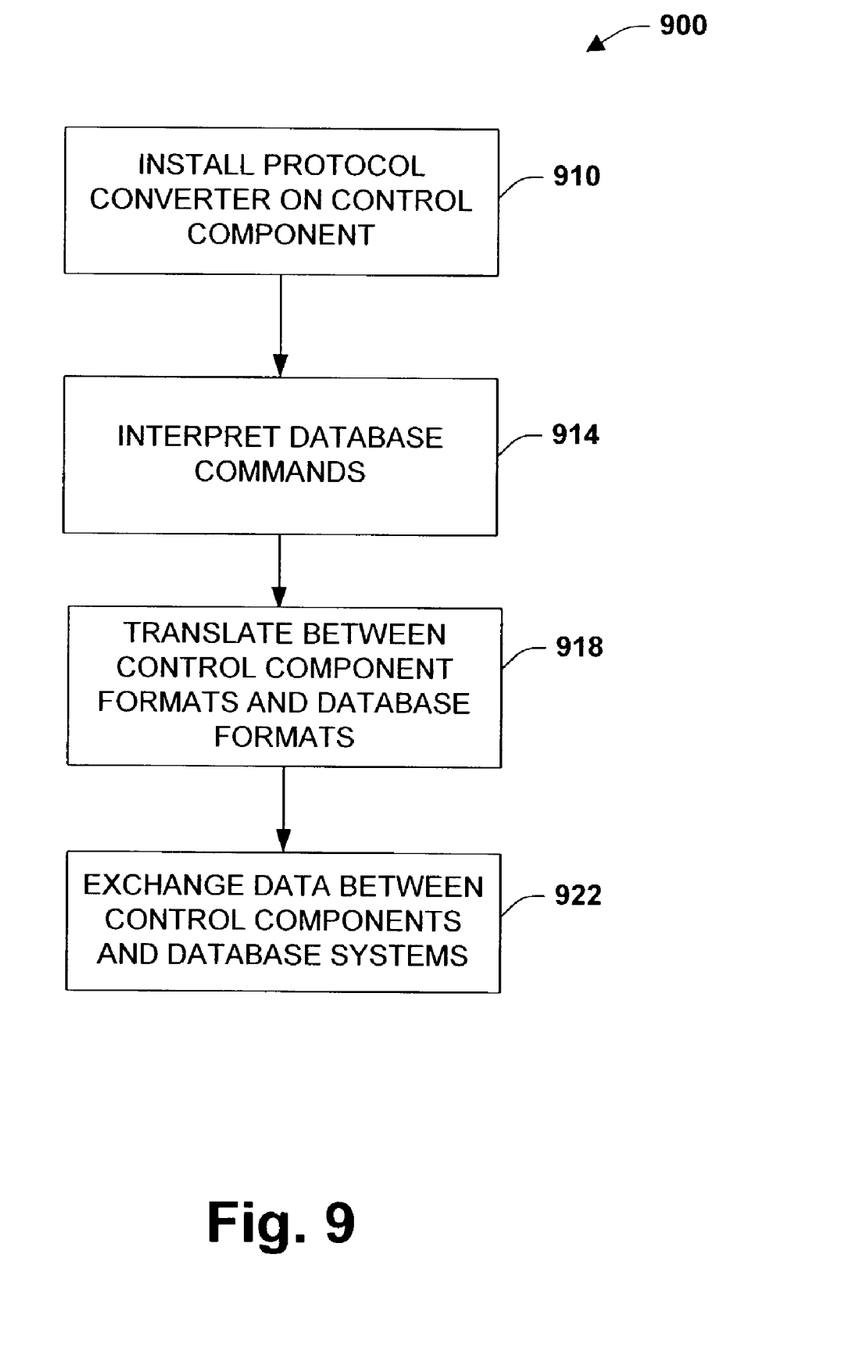
FIG. 9 illustrates a remote database methodology in accordance with an aspect of the present invention.

FIG. 9 illustrates a database methodology to facilitate control data exchange in accordance with the present invention. While, for purposes of simplicity of explanation, the methodology may be shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring now to FIG. 9, and proceeding to 910, a protocol converter is installed on an industrial control component. As noted above, the protocol converter can reside in the industrial control component and/or be associated with the industrial control component such as reside on a communications module or I/O module, or interface system that interacts with a PLC. At 914, one or more database commands are interpreted by the industrial control components. Such commands can be encoded in substantially any data type or format. If desired, such encoding can include various encryption techniques (e.g., encrypt control file with a 168 bit encryption key). As noted above, the encoding can be in an SQL, XML, SQLXML and the like, if desired. At 918, data translations occur between industrial control formats and database formats. As noted above, such translations can be provided by the protocol converter that can translate between row/column format and industrial control component data table format and/or other network formats, for example. At 922, data is exchanged between one or more control components and one or more database systems utilizing a database language.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An industrial control system, comprising:
an industrial control component adapted to communicate across a network via a plurality of database protocols, wherein a protocol converter in the control component translates data between the database protocols and one or more industrial control protocols; and
at least one of a client and a server database to communicate with the industrial control component through employment of at least one controller tag element in accordance with the database protocol, wherein control data from a programmable logic controller of the industrial controller is exchanged with the database.

2. The system of claim 1, the client and server databases accesses the industrial control component via a query that employs the database protocol.

3. The system of claim 1, the industrial control component is adapted as at least one of a client and a server in order to exchange the data with the databases.

4. The system of claim 1, the database protocol is at least one of an SQL protocol, an XML protocol, and an SQLXML protocol.

5. The system of claim 1, further comprising a protocol converter to translate data between the database protocols and one or more industrial control protocols.

6. The system of claim 5, the industrial control protocols including at least one of a data table format, a Control an Information Protocol (CIP), an Ethernet protocol, a ControlNet protocol, a DeviceNet protocol, a remote I/O protocol, a Data Highway protocol, a Data Highway+protocol, a Fieldbus protocol, a Modbus protocol, a Profibus protocol, and an OLE for Process Control (OPC) protocol.

7. The system of claim 5, the protocol converter translates between a row and column format and the industrial control data structures and protocols.

8. The system of claim 7, the protocol converter includes at least one of a row/column to data table converter, and a data table to row/column converter.

9. The system of claim 5, the protocol converter includes an SQL command interpreter to process one or more commands associated with the database protocols.

10. The system of claim 9, the commands include at least one of a select statement, a where clause, a from clause, a like clause, an operator, a create table statement, a constraint, an insert statement, an update statement, a delete statement, a drop table command, an aggregate function, a group by clause, a having clause, an order by clause, a conditional operator, a boolean operator, an in and between clause, a mathematical operator, a modulo operator, and a join function or operator to facilitate relational operations with a database.

11. The system of claim 1, further comprising a data object having one or more rows and one or more columns.

12. The system of claim 11, the data object is associated with at least one of a name and a tag.

13. The system of claim 1, further comprising at least one application that employs the database protocols, the application is associated with at least one of data collection, monitoring, quality control, accounting, and material management.

14. The system of claim 13, the application at least one of sends a query, determines which industrial control components have reported, and determines from the query a "who" function indicating a network configuration.

15. The system of claim 13, the industrial control component reports at least one of a fault, a diagnostic, a maintenance condition and a status condition to the application in accordance with the database protocol.

16. The system of claim 1, the network is at least one of an Internet, an Intranet, and a factory network.

17. The system of claim 1, the industrial control component includes at least one of a programmable logic controller (PLCs), a communications module and an I/O module.

18. A method for exchanging data between an industrial control component and a database, comprising:
adapting at least one control component in the industrial controller to process a plurality of database languages through use of controller schema, wherein a protocol converter in the control component translates data between the database protocols and one or more industrial control protocols;
exchanging data with the control component in accordance with the one or more database languages, wherein the control component exchanges control data from/to a programmable logic controller (PLC).

19. The method of claim 18, the database language is at least one of an SQL language, an XML language, and an SQLXML language.

20. The method of claim 18, further comprising converting data between the database languages and one or more industrial control protocols.

21. The method of claim 20, further comprising translating between a row and column format and the industrial control protocols.

22. The method of claim 18, further comprising processing one or more commands associated with the database languages.

23. The method of claim 18, further comprising at least one of data collecting, data monitoring, quality controlling, accounting, and material managing to facilitate higher-level controls in an industrial control system.

24. The method of claim 18, further comprising at least one of sending a query, determining the control component that has responded to the query, and determining from the query a function indicating a network configuration.

25. The method of claim 18, the database language is employed to report at least one of a fault, a diagnostic, a maintenance condition and a status condition.

26. A database and industrial control system, comprising:
means for adapting an industrial control system to automatically translate control data between an industrial protocol and a plurality of database protocols, wherein the control data is received from a programmable logic controller; and
means for exchanging the control data between an industrial control component and a database utilizing the database protocols.

27. A computer readable medium having stored thereon a data structure, comprising:
a first data field representing at least one of a row and a column expression relating to a database component associated with one or more database protocols; and
a second data field representing an industrial control data format derived from the first data field by utilizing at least one of a controller tag element and controller schema.

28. The medium of claim 27, the data structure is at least one of an SQL format, an XML format, and an SQLXML format.

* * * * *